United States Patent Office 3,463,826
Patented Aug. 26, 1969

3,463,826
MANUFACTURE OF HALOGENATED PINACOLS
Hermann Richtzenhain, Cologne-Sulz, and Paul Riegger, Bonn, Germany, assignors to Dynamit Nobel Aktiengesellschaft, Troisdorf, Bezirk-Cologne, Germany, a corporation of Germany
No Drawing. Filed Jan. 3, 1966, Ser. No. 517,969
Claims priority, application Germany, Mar. 17, 1965, D 46,817
Int. Cl. C07c 31/18; B01j 1/10
U.S. Cl. 260—633        6 Claims

ABSTRACT OF THE DISCLOSURE

Halogenation of pinacols by the reaction of a halogen with pinacol under substantially anhydrous conditions, under the influence of visible or ultra-violet radiation, and preferably in the presence of an inert reaction medium at the boiling point of the reaction medium.

This invention relates to chlorinated pinacols. It more particularly refers to a novel process for the production of chlorinated pinacols.

It would be expected from a consideration of the structure of pinacol that it could react with halogens in many different ways. Another probable reaction would be the esterification of one or both of the hydroxyl groups of pinacol with the halogen to produce mono or di hypohalites and evolve hydrogen halide. The thus evolved hydrogen halide could act as an esterifying agent to replace the hydroxyl group with a halogen or as a dehydrating agent to produce dimethyl butadiene or dimethyl butenol as the case may be.

None of these projected and expected products are as valuable or desirable as would be the halogenated pinacols wherein the pinacol structure is maintained and the halogens is (are) grafted onto the hydrocarbon backbone replacing one or more of the hydrogens thereof.

It is therefore an object of this invention to provide a novel process for producing halogen substituted pinacols which retain the pinacol structure.

It is another object of this invention to provide a process for producing halogenated pinacols wherein by-product formation is small or non-existent.

It is another object of this invention to provide an extremely simple process for the production of halogenated pinacols.

It is still a further object of this invention to provide a novel process for the production of chlorinated pinacols.

Other and additional objects of this invention will be apparent from a full consideration of this specification as well as the claims thereof.

In accord with and fulfilling these objects, this invention resides, in its broadest aspects, in the reaction of a halogen, such as chlorine or bromine for example, with pinacol under substantially anhydrous conditions and under the influence of visible or ultra-violet radiation. It has been found that by reacting the halogen with the pinacol under these conditions, the product is almost wholly, and in many cases entirely a halogenated pinacol which retains the pinacol structure and has the halogen grafted upon the hydrocarbon portion of the pinacol molecule.

Generally, the reaction product of the process generally described above is not a pure compound, but is rather a series of halogenated pinacols containing from 1 to 3 halogen substituents, but up to 12 halogen substituents are also possible. This reaction product is readily separable and resolvable by relatively common chemical product purification techniques such as, for example, by distillation, fractional crystallization, extraction, etc.

It has been found that this reaction proceeds well at temperatures from about 10 to 120° C. under atmospheric, vacuum or elevated pressures as the case may be. The catalyst may suitably be a source of light such as a lamp contained within the reaction vessel or zone or such source of radiation may be external to the reaction chamber, if the walls thereof are transparent to such radiation.

It has been found to be particularly expedient to carry out this reaction of a halogen with pinacol in the presence of an inert solvent, preferably one which boils in the range of 10 to 120° C. By inert solvent is meant one which will not react with the halogen, pinacol or the halogenated pinacol under the conditions of reaction specified or under purification conditions. Particularly advantageous results have been achieved using halogenated hydrocarbons as the reaction solvent or medium.

As has been stated above, it is essential that this reaction be carried out under anhydrous conditions. This has been accomplished by conducting the reaction at the boiling point of the reaction medium and permitting the boiling reaction medium to carry out of the reaction zone any small amounts of water which may be formed along with the by-product hydrogen halide. The water, if any, and the hydrogen halide are removed from the reaction medium which is condensed and returned to the reaction zone.

In particular, carbon tetrachloride, trichlorobromomethane, 1,2-difluoro-tetrachloroethane, 1,1,2-trifluoro-1, 2,2-trichloroethane, hexafluorobenzene and hexafluoro-1,2-dichlorocyclobutane are the preferred reaction media, with carbon tetrachloride the most preferred.

Chlorine is the preferred halogen.

The products of the process of this invention generally correspond to the following formula:

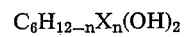

$$C_6H_{12-n}X_n(OH)_2$$

wherein $n$ is a whole integer from 1 to 12 and X is a halogen, preferably chlorine. These products are useful as plasticizers or solvents for homo and/or copolymers of vinylchloride, vinylfluoride and vinylidene chloride. Typical plasticizer concentrations are up to about 5 percent by weight based upon the total polymer weight.

The following examples are given by way of illustration and should not be construed as limiting upon the scope of the invention.

Experiments I to IV 118 grams (1 mol) of pinacol dissolved in 250 g. of carbon tetrachloride were placed in a Pyrex glass tube 500 mm. long having a diameter of 30 mm., which had a frit gas filter fused into its bottom end, and had at its upper end a water separator with a reflux condenser, as well as a gas exhaust. Chlorine was introduced through the frit by a rotameter, while the mixture was simultaneously irradiated from the outside by means of two ultra-violet lamps (Type S18/80 watts, made by Quarzlampen-G.m.b.H. of Hanau) disposed at approximately equal height.

The chlorination reaction started immediately, the heat of the reaction bringing the mixture to a boil. The evaporated solvent was condensed in the reflux condenser and fed through the water separator back to the reaction chamber, while small amounts of water were collected in the separator and the hydrogen chloride entrained by the solvent vapors escaped through the gas exhaust.

The reaction products were then subject to a fractional distillation. In accordance with the amount of chlorine used per unit of time, the reaction developed chlorinated pinacols of varying chlorine content.

The following table illustrates the resolution of the product mix formed in the examples. It should be noted that the values for $n$ reported in the table are average values for the fraction and therefore this is set forth as $\bar{n}$.

The products could be further purified and resolved by recrystallization, e.g., from benzene. For example, dichloropinacol was recovered by recrystallization. It had a melting point of 92° C.

4. Process claimed in claim 1, wherein said chlorinated pinacols are recovered by distillation.

5. Chlorinated pinacols prepared by the process of claim 1 and having a chlorine content of up to 62.3 percent.

6. A chlorinated pinacol as claimed in claim 5, having a melting point of 92° C., wherein said chlorine substitution is dichloro.

| Experiment No. | Chlorination time and rate of introduction of chlorine | Fraction No. | Quantity (g.) | Boiling points of the fractions | | Percent Cl. | $\bar{n}$ | Pinacol transformation (percent) | Yield of distilled chloropinacols (percent of the reacted pinacol) |
| --- | --- | --- | --- | --- | --- | --- | --- | --- | --- |
| | | | | B.P. (° C.) | Pressure (Torr) | | | | |
| I | 15 min., 50 l. Cl₂ per hour. | 1 | 38 | 90–105 | 21 | 17.40 | 0.75 | 65 | 87 |
| | | 2 | 40 | 105–106 | 21 | 24.33 | 1.06 | | |
| | | 3 | 29.5 | 106–116 | 15 | 32.11 | 1.54 | | |
| II | 40 min., 50 l. Cl₂ per hour. | 1 | 11 | 66–90 | 12 | | | 100 | 86.0 |
| | | 2 | 91 | 90–120 | 12 | 32.27 | 1.54 | | |
| | | 3 | 66 | 97 | to 0.2 | 42.32 | 2.36 | | |
| III | 50 min., 50 l. Cl₂ per hour. | 1 | 17 | 78–86 | 0.1 | | | 100 | 84.2 |
| | | 2 | 129 | 86 | 0.1 | 47.2 | 2.9 | | |
| | | 3 | 60 | 86.91 | 0.1 | 52.25 | 3.5 | | |
| IV | 55 min., 75 .1 Cl₂ per hour, and 65 min., 50 l. Cl₂ per hour. | 1 | 10 | to 123 | 0.15 | | | 100 | 81.6 |
| | | 2 | 85.5 | 119–121 | 0.05 | 58.5 | 4.5 | | |
| | | 3 | 104 | 122–126 | 0.05 | 60.1 | 4.9 | | |
| | | 4 | 45 | 126–129 | 0.05 | 62.3 | 5.3 | | |

It should be understood that this invention can be carried out batchwise or continuously as desired. Either reactant can be used in excess. It should be understood that the greater the mol excess of the halogen, the greater will be the tendency to produce higher substituted products. This is also true of the reaction time. The degree of halogen substitution tends to increase as the reaction residence time increases.

While the invention has been described with reference to certain specific embodiments, various changes and modifications which fall within the spirit of the invention will become apparent to the skilled artisan. The invention is therefore only intended to be limited by the appended claims or their equivalents wherein we have endeavored to claim all inherent novelty.

What is claimed is:
1. A process for the production of chlorinated pinacols which comprises contacting pinacol and chlorine in substantially anhydrous chlorinated hydrocarbon reaction medium in the presence of ultraviolet or visible light at a temperature of about 10 to 120° C.

2. Process claimed in claim 1, carried out at the boiling point of said reaction medium.

3. Process claimed in claim 1, wherein said reaction medium is selected from the group consisting of carbon tetrachloride, trichlorobromomethane, 1,2-difluoro-tetrachloroethane, 1,1,2-trifluoro-1,2,2-trichloroethane, hexafluorobenzene, and hexafluoro-1,2-dichlorocyclobutane.

References Cited

UNITED STATES PATENTS

| 2,473,162 | 6/1949 | McBee et al. | 204—163 |
| 2,571,901 | 10/1951 | Lawlor | 204—163 XR |
| 2,811,485 | 10/1957 | Evans | 204—163 |
| 3,121,121 | 2/1964 | Lindsey et al. | 260—633 |
| 3,129,053 | 4/1964 | Castle | 260—633 XR |

FOREIGN PATENTS 581,431  10/1946  Great Britain.

OTHER REFERENCES

Farmer et al., Chemical Society, Journal, 1930, pp. 510–521, QD1C 6.

Cope et al., J. Amer. Chem. Soc., vol. 80, pp. 5499–5502, 1958, QD1A 5.

LEON ZITVER, Primary Examiner

HOWARD T. MARS, Assistant Examiner

U.S. Cl. X.R.

204—158; 260—33.4